(12) United States Patent
Okamura et al.

(10) Patent No.: US 10,850,600 B2
(45) Date of Patent: Dec. 1, 2020

(54) DRIVE FORCE CONTROL SYSTEM FOR HYBRID VEHICLES

(71) Applicant: Toyota Jidosha Kabushiki Kaisha, Toyota (JP)

(72) Inventors: Yukari Okamura, Gotemba (JP); Tatsuya Imamura, Okazaki (JP); Yasuhiro Oshiumi, Gotemba (JP); Kazuma Aoki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/225,977

(22) Filed: Dec. 19, 2018

(65) Prior Publication Data
US 2019/0184807 A1 Jun. 20, 2019

(30) Foreign Application Priority Data
Dec. 20, 2017 (JP) .................................. 2017-243602

(51) Int. Cl.
| | |
|---|---|
| *B60K 6/365* | (2007.10) |
| *B60K 6/445* | (2007.10) |
| *B60K 6/387* | (2007.10) |
| *B60W 30/182* | (2020.01) |
| *B60W 10/08* | (2006.01) |
| *B60W 10/06* | (2006.01) |
| *B60W 10/02* | (2006.01) |
| *B60W 30/18* | (2012.01) |
| *B60K 6/52* | (2007.10) |
| *B60K 1/00* | (2006.01) |

(Continued)

(52) U.S. Cl.
CPC ................ *B60K 6/365* (2013.01); *B60K 1/00* (2013.01); *B60K 6/387* (2013.01); *B60K 6/445* (2013.01); *B60K 6/52* (2013.01); *B60W 10/02* (2013.01); *B60W 10/06* (2013.01); *B60W 10/08* (2013.01); *B60W 20/30* (2013.01); *B60W 30/182* (2013.01); *B60W 30/18036* (2013.01); *B60K 2001/001* (2013.01); *B60K 2006/381* (2013.01)

(58) Field of Classification Search
CPC ........ B60K 6/445; B60K 6/365; B60K 6/387; B60W 30/18036; B60W 30/182
See application file for complete search history.

(56) References Cited

U.S. PATENT DOCUMENTS

| | | | | |
|---|---|---|---|---|
| 9,428,179 B2 * | 8/2016 | Kato | ...................... | B60W 20/10 |
| 9,475,488 B2 * | 10/2016 | Tagawa | ................. | B60W 20/30 |

(Continued)

FOREIGN PATENT DOCUMENTS

JP 2017-007437 A 1/2017

*Primary Examiner* — David R Morris
(74) *Attorney, Agent, or Firm* — Sughrue Mion, PLLC

(57) ABSTRACT

A drive force control system for hybrid vehicles to prevent a reduction in drive force during reverse propulsion while operating an engine. An operating mode of a transmission mechanism can be selected from a first mode in which the output torque of the engine is delivered to the output member at a first predetermined ratio and a second mode in which the output torque of the engine is delivered to the output member at a second predetermined ratio that is smaller than the first predetermined ratio. A controller is configured to restrict selection of the first mode when the engine generates a power greater than a predetermined power during propulsion of the hybrid vehicle in the reverse direction.

10 Claims, 21 Drawing Sheets

(51) Int. Cl.
*B60W 20/30* (2016.01)
*B60K 6/38* (2007.10)

(56) References Cited

U.S. PATENT DOCUMENTS

| | | | |
|---|---|---|---|
| 10,093,165 B2 * | 10/2018 | Imamura | B60W 20/14 |
| 10,195,930 B2 * | 2/2019 | Endo | B60K 6/442 |
| 10,350,983 B2 * | 7/2019 | Imamura | B60W 10/06 |
| 10,525,816 B2 * | 1/2020 | Imamura | B60K 6/365 |
| 10,562,522 B2 * | 2/2020 | Omuro | B60W 10/08 |
| 10,625,592 B2 * | 4/2020 | Imai | B60W 10/08 |
| 2015/0158481 A1 * | 6/2015 | Tagawa | B60W 20/30 |
| | | | 701/22 |
| 2015/0197244 A1 * | 7/2015 | Kato | B60W 20/00 |
| | | | 701/22 |
| 2016/0325735 A1 * | 11/2016 | Kato | B60W 20/50 |
| 2016/0368361 A1 | 12/2016 | Endo et al. | |
| 2017/0274754 A1 * | 9/2017 | Imamura | B60K 6/365 |
| 2018/0022204 A1 * | 1/2018 | Imamura | B60K 6/445 |
| | | | 180/65.235 |
| 2018/0264924 A1 * | 9/2018 | Imamura | B60K 6/365 |
| 2019/0084404 A1 * | 3/2019 | Imai | B60W 30/18036 |
| 2019/0084554 A1 * | 3/2019 | Yamamoto | B60K 6/26 |
| 2019/0084555 A1 * | 3/2019 | Omuro | B60K 6/365 |

\* cited by examiner

Fig. 4

| Operating Mode | | CL1 | CL2 | B1 | MG1 | MG2 | ENG |
|---|---|---|---|---|---|---|---|
| HV Mode | HV-Lo Mode | ● | – | – | G | M | ON |
| | HV-Hi Mode | – | ● | – | G | M | ON |
| | Fixed Mode | ● | ● | – | | | ON |
| EV Mode | Dual-Motor Mode — EV-Lo Mode | – | – | ● | M | M | OFF |
| | Dual-Motor Mode — EV-Hi Mode | – | ● | ● | M | M | OFF |
| | Single-Motor Mode | – | – | – | | M | OFF |

DRIVE FORCE CONTROL SYSTEM FOR HYBRID VEHICLES

CROSS-REFERENCE TO RELATED APPLICATIONS

The present disclosure claims the benefit of Japanese Patent Application No. 2017-243602 filed on Dec. 20, 2017 with the Japanese Patent Office, the disclosures of which are incorporated herein by reference in its entirety.

BACKGROUND

Field of the Disclosure

Embodiments of the present disclosure relate to the art of a drive force control system for a hybrid vehicle, in which a differential mechanism is connected to an engine and a first motor, and in which a second motor is connected to an output member of the differential mechanism.

Discussion of the Related Art

JP-A-2017-007437 describes a drive unit for a hybrid vehicle in which an output torque of an engine is distributed to a first motor and to an output side through a power split mechanism, and in which an output torque of a second motor driven by electricity supplied from the first motor is synthesized with the engine torque. In the drive unit taught by JP-A-2017-007437, the power split mechanism is adapted to establish a low mode in which a ratio of the power delivered to the output side to the power delivered to the first motor is relatively large, and a high mode in which the above-mentioned ratio is relatively small.

During propulsion of the vehicle taught by JP-A-2017-007437 along a straight line, the engine generates a drive torque and the first motor establishes a reaction torque. In this situation, a speed of the first motor is controlled in such a manner as to adjust an engine speed to a target speed.

Since a direction of an output torque of the engine is unilateral and the vehicle taught by JP-A-2017-007437 does not have a torque reversing mechanism, in the vehicle taught by JP-A-2017-007437, the engine torque is applied to drive wheels in an opposite direction to reverse the vehicle. According to the teachings of JP-A-2017-007437, therefore, the vehicle is propelled in the reverse direction by an output torque of the second motor.

However, the engine may be activated during propulsion in the reverse direction when warming up a purifying catalyst or when operating a defroster by an exhaust heat. In those cases, the engine speed is also controlled by the first motor. When controlling the engine speed by the reaction torque established by the first motor, an output torque of the engine is partially delivered to the drive wheels as the case of propelling the vehicle in the forward direction. In this situation, the drive torque of the second motor is applied to the drive wheels but cancelled by the engine torque delivered to the drive wheels. Consequently, the drive force to propel the vehicle in the reverse direction is reduced.

In addition, if the low mode is selected when propelling the vehicle in the reverse direction while operating the engine, the drive force to propel the vehicle in the reverse direction may be further reduced.

SUMMARY

Aspects of embodiments of the present disclosure have been conceived noting the foregoing technical problems, and it is therefore an object of the present disclosure is to provide a drive force control system for hybrid vehicles configured to prevent a reduction in drive force during reverse propulsion while operating an engine.

The drive force control system according to the embodiment of the present disclosure is applied to a hybrid vehicle, comprising an engine, a first rotary machine, a transmission mechanism, and a second rotary machine. In the transmission mechanism, a first rotary element connected to the engine, a second rotary element connected to the first rotary machine, and a third rotary element connected to an output member are connected to one another to perform a differential action. The transmission mechanism transmits a torque delivered from the engine to the output member when the first rotary machine establishes a reaction torque. An operating mode of the transmission mechanism can be selected from a first mode in which the output torque of the engine is delivered to the output member side at a first predetermined ratio, and a second mode in which the output torque of the engine is delivered to the output member side at a second predetermined ratio that is smaller than the first predetermined ratio. The second rotary machine is connected to the output member to transmit a torque to the output member. The hybrid vehicle is propelled in a reverse direction by a reverse torque generated by the second motor, and in the hybrid vehicle, a torque delivered from the engine to the output member through the transmission mechanism during operation of the engine counteracts the reverse torque. In order to achieve the above-explained objective, according the embodiment of the present disclosure, a controller is configured to restrict selection of the first mode when the engine generates a power greater than a predetermined power during propulsion of the hybrid vehicle in the reverse direction.

In a non-limiting embodiment, the controller may be further configured to determine that the engine generates a power greater than the predetermined power based on any one of: a drive power; a total output of the engine, the first rotary machine, and the second rotary machine; a required drive force; a state of charge level of a battery; and a voltage of the battery.

In a non-limiting embodiment, the drive force control system for a hybrid vehicle may further comprise a purification device that purifies an exhaust of the engine. In addition, the controller may be further configured to determine that the engine generates a power greater than the predetermined power based on a fact that a temperature of the purification device is lower than a predetermined temperature.

In a non-limiting embodiment, the controller may be further configured to determine that the engine generates a power greater than the predetermined power based on a fact that the vehicle is stopped by operating an accelerator to generate a drive force and a brake to establish a brake force simultaneously.

In a non-limiting embodiment, the drive force control system for a hybrid vehicle may further comprise a defroster that blows an exhaust heat from the engine. In addition, the controller may be further configured to determine that the engine generates a power greater than the predetermined power based on a fact that the defroster is in operation.

In a non-limiting embodiment, the controller may be further configured to restrict selection of the first mode when the hybrid vehicle is expected to be propelled in the reverse direction, or the engine is expected to generate a power greater than the predetermined power.

In a non-limiting embodiment, the controller may be further configured to switch the operating mode from the first mode to the second mode before propelling the hybrid vehicle in the reverse direction, when the hybrid vehicle propelled in the first mode is expected to be propelled in the reverse direction.

In a non-limiting embodiment, the first rotary machine may establish a reaction torque when the engine generates a power greater than the predetermined power, and the first rotary machine may not establish a reaction torque when the engine generates a power smaller than the predetermined power.

In a non-limiting embodiment, a torque delivered from the engine to the output member through the transmission mechanism when the engine generates a power greater than the predetermined power and the first motor establishes a reaction torque may counteract the reverse torque. The first rotary machine may include a first motor having a generating function, and the second rotary machine may include a second motor that generates a drive torque when an electric power is supplied thereto. The first motor may be adapted to translate a power applied thereto from the engine through the transmission mechanism into an electric power, and to supply the translated electric power to the second motor to generate the reverse torque by the second motor.

Thus, the output torque of the engine is transmitted to the output member through the transmission mechanism by establishing the reaction torque by the first rotary machine. In the hybrid vehicle, the torque delivered to the output member is increased in the first mode in comparison with that in the second mode. When the engine generates a power greater than a predetermined power during reverse propulsion, the torque delivered from the engine to the output member through the transmission mechanism reduces a drive force to propel the hybrid vehicle in the reverse direction. According to the embodiment of the present disclosure, therefore, the controller restricts selection of the first mode when the engine generates a power greater than the predetermined power during reverse propulsion of the hybrid vehicle. For this reason, the torque mechanically transmitted from the engine to the output member can be reduced thereby preventing a reduction in the maximum drive force during propulsion in the reverse direction.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 4 is a table showing engagement states of engagement devices and operating conditions of the prime movers in each operating mode;

DETAILED DESCRIPTION OF THE PREFERRED EMBODIMENT(S)

Figure 1:
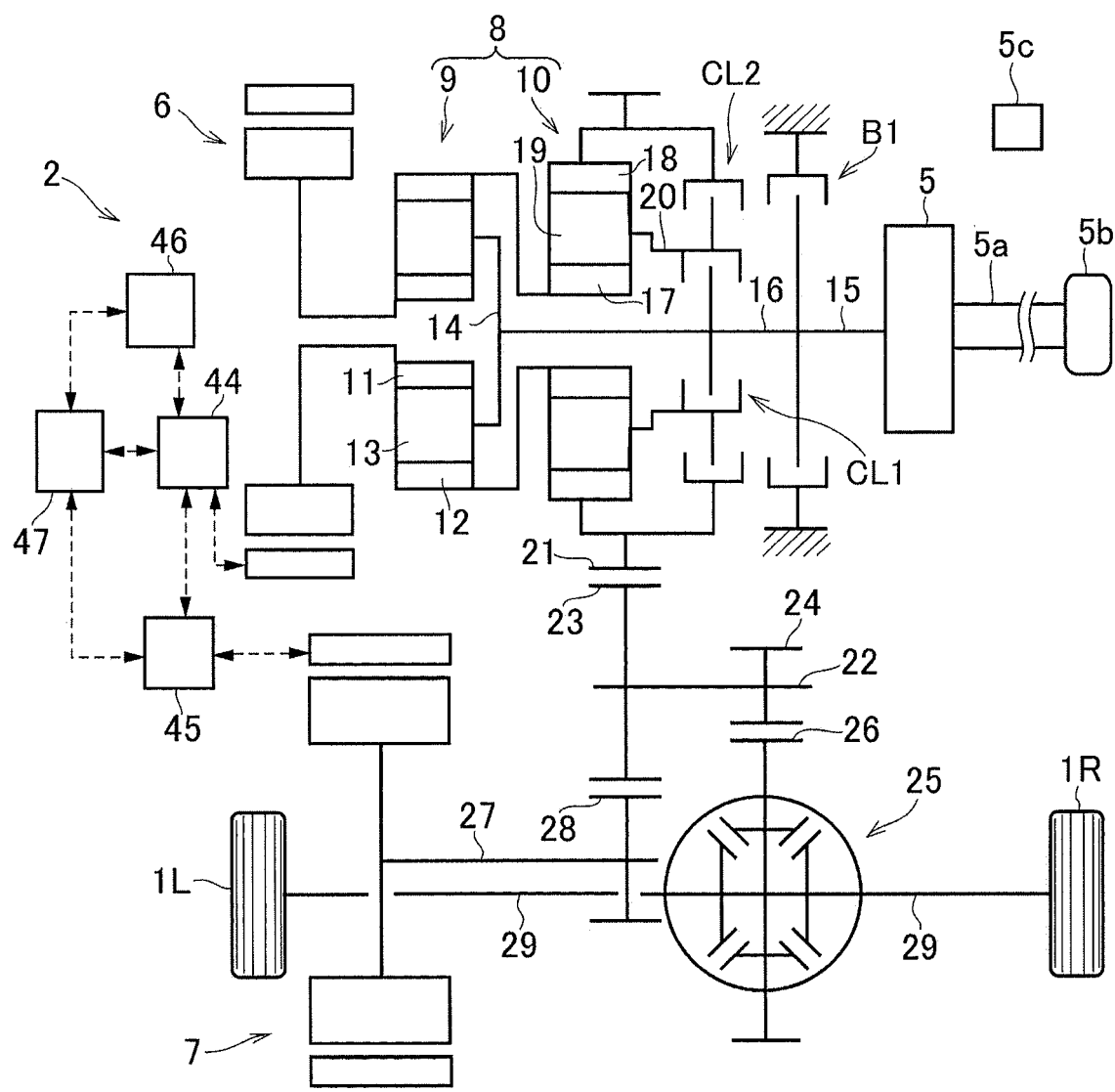
FIG. 1 is a skeleton diagram showing a first drive unit of the hybrid vehicle according to at least one embodiment of the present disclosure.
Figure 2:
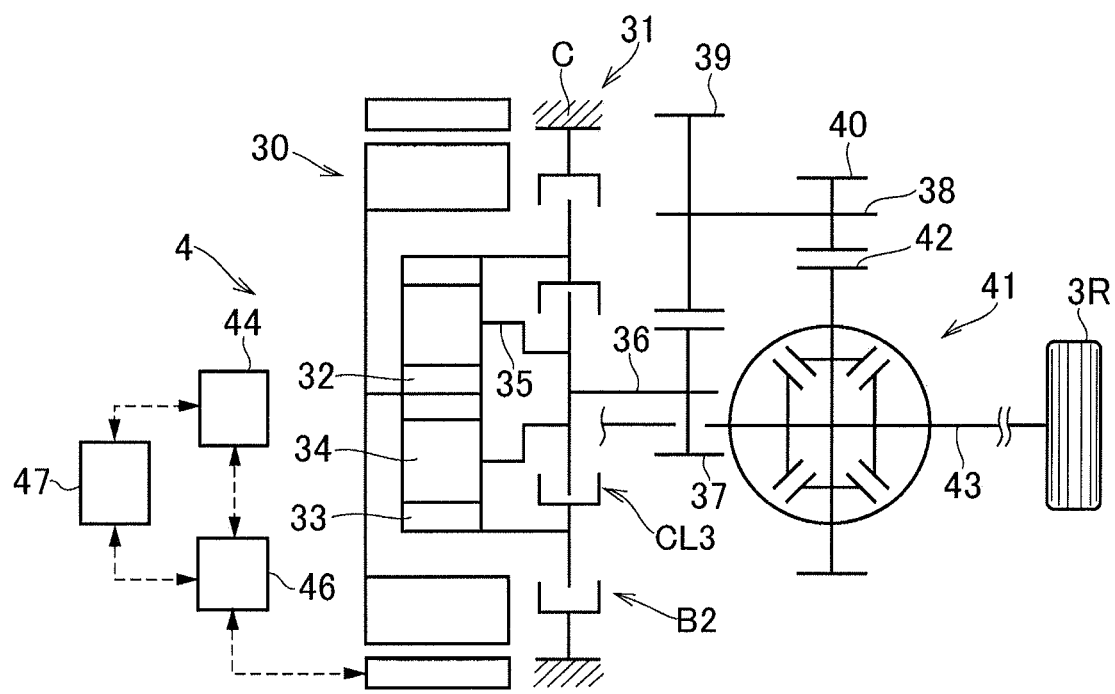
FIG. 2 is a skeleton diagram showing a second drive unit of the hybrid vehicle according to at least one embodiment of the present disclosure.

Preferred embodiments of the present application will now be explained with reference to the accompanying drawings. Referring now to FIGS. 1 and 2, there are shown the first embodiment of the hybrid vehicle according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The hybrid vehicle is provided with an engine 5, a first motor 6 and a second motor 7. Specifically, the first motor 6 is a motor-generator having a generating function (abbreviated as "MG1" in the drawings). In the hybrid vehicle according to the first embodiment, a speed of the engine 5 is controlled by the first motor 6, and the second motor 7 is driven by electric power generated by the first motor 6 to generate a drive force for propelling the vehicle. Optionally, the second motor 7 (abbreviated as "MG2" in the drawings) may also be used as the motor-generator having a generating function. In the hybrid vehicle, accordingly, the first motor 6 serves as a first rotary machine.

The engine 5 is connected to an exhaust pipe 5a so that an exhaust gas of the engine 5 is exhausted therethrough. The exhaust pipe 5a is connected to a purification device 5b that purifies the exhaust gas flowing through the exhaust pipe 5a. In order to enhance a purification performance of the purification device 5b, the purification device 5b is warmed up by supplying richer air/fuel mixture to the engine 5 to raise a temperature of the exhaust gas. In other words, an output power of engine 5 is increased to warm up the purification device 5b.

The hybrid vehicle is provided with a defroster 5c to prevent condensation of a predetermined member utilizing an exhaust heat from the engine 5. The defroster 5c is adapted to collect the exhaust heat from the engine 5 through the cooling water of the engine 5, and to blow the collected heat to the predetermined member such as a windshield glass.

A power split mechanism 8 as a transmission is connected to the engine 5. The power split mechanism 8 includes a power split section 9 that distributes the engine torque to the first motor 6 side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 to the carrier 14 of the power split section 9. To this end, for example, a wet-type multiple plate clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element. In the embodiment, accordingly, the carrier 14 or the carrier 20 serves as a first rotary element, the sun gear 11 serves as a second rotary element, and the ring gear 18 serves as a third rotary element.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the hybrid vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47. In the hybrid vehicle according to the embodiment, the second motor 7 and the rear motor 30 serve as a second rotary machine.

Figure 3:
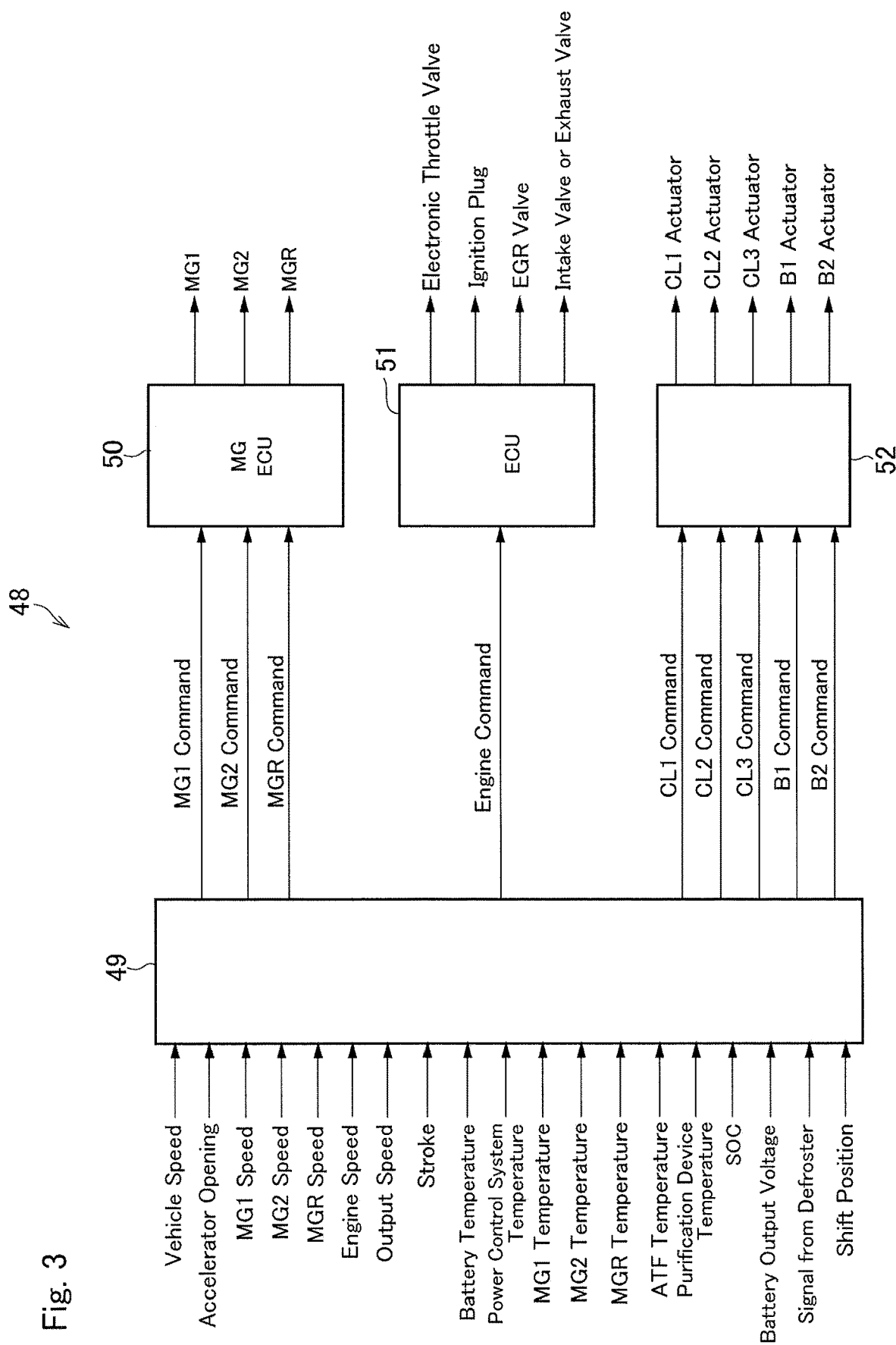
FIG. 3 is a block diagram showing a structure of an electronic control unit.

In order to control the first power control system 44, the second power control system 45, the third power control system 46, the engine 5, the clutches CL1, CL2, CL3, and the brakes B1,B2, the hybrid vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50, an engine ECU 51, and a clutch ECU 52.

The main ECU 49 is configured to execute a calculation based on incident data transmitted from sensors as well as maps and formulas installed in advance, and transmits a calculation result to the motor ECU 50, the engine ECU 51, and the clutch ECU 52 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the ECUs 44, 45, and 46; a temperature of the first motor 6; a temperature of the second motor 7; a temperature of the rear motor 30; a temperature of oil (i.e., ATF) lubricating the power split mechanism 8 and the transmission 31; a temperature of the purification device 5b; a state of charge (to be abbreviated as the "SOC" hereinafter) level of the battery 47; an output voltage of the battery 47; a signal of a switch that activate the defroster 5c; a shift position and so on.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the hybrid vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

In addition, the main ECU 49 transmits a command signals to activate a fan (not shown) that blows hot wind to a predetermined member in response to an operation of a switch to activate the defroster 5c.

In the hybrid vehicle according to the embodiment, an operating mode may be selected from a hybrid mode (to be abbreviated as the "HV mode" hereinafter) in which the hybrid vehicle is propelled by a drive torque generated by the engine 5, and an electric vehicle mode (to be abbreviated as the "EV mode" hereinafter) in which the hybrid vehicle is propelled by drive torques generated by the first motor 6 and the second motor 7 without using the engine 5. The HV mode may be selected from a hybrid-low mode (to be abbreviated as the "HV-Lo mode" hereinafter) as a first mode of the embodiment, a hybrid-high mode (to be abbreviated as the "HV-Hi mode" hereinafter) as a second mode of the embodiment, and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a dual-motor mode in which both of the first motor 6 and the second motor 7 generate drive torques to propel the hybrid vehicle, and a single-motor mode in which only the second motor 7 generates a drive torque to propel the hybrid vehicle. Further, the dual-motor mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor.

FIG. 4 shows engagement states of the first clutch CL1, the second clutch CL2, and the first brake B1, and operating conditions of the first motor 6, the second motor 7, and the engine 5 in each operating mode. In FIG. 4, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 5:
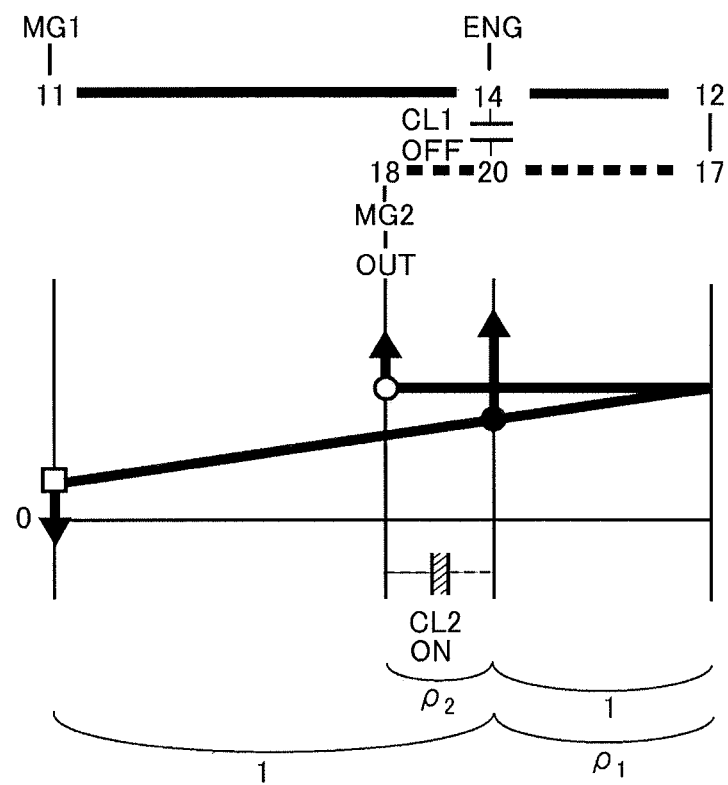
FIG. 5 is a nomographic diagram showing a situation in a HV-high mode.
Figure 6:
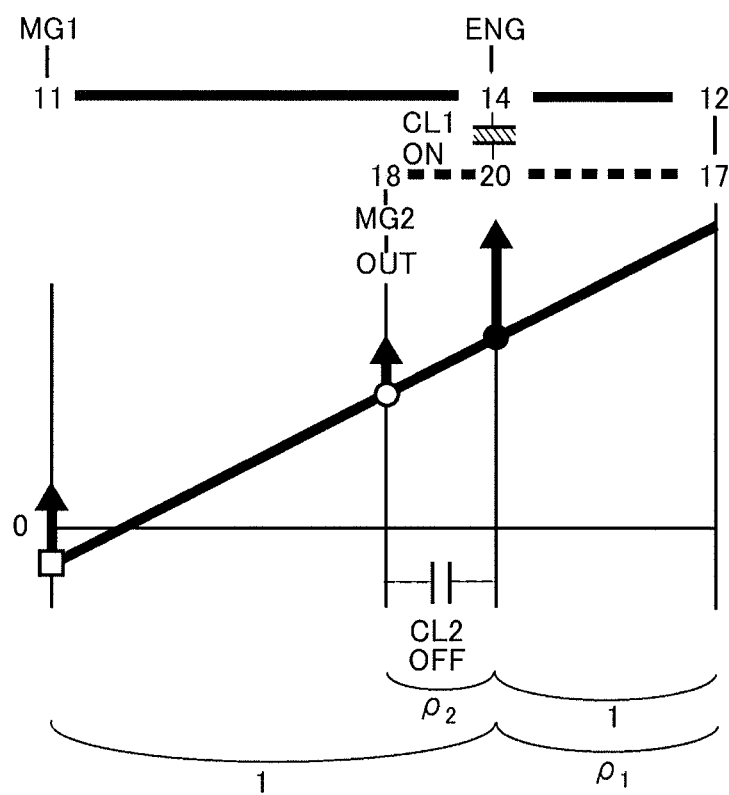
FIG. 6 is a nomographic diagram showing a situation in a HV-low mode.

As indicated in FIGS. 5 and 6, in the HV-Hi mode and the HV-Lo mode, any one of the first clutch CL1 and the second clutch CL2 is engaged, and the engine 5 generates a drive torque while establishing a reaction torque by the first motor 6. In this situation, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Specifically, the reaction torque established by the first motor 6 is governed by a split ratio of the torque delivered from the engine 5 to the first motor 6 side through the power split mechanism 8. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\rho1 \cdot \rho2)$", and a ratio of the torque applied to the ring gear 18 in the HV-Hi mode may be expressed as "$1/(\rho1)$". In other words, given that the torque of the engine 5 is "1", a ratio of the torque of the engine 5 delivered to the ring gear 18 in the HV-Lo mode may be expressed as "$1/(1-(\rho1 \cdot 2))$", and a ratio of the torque of the engine 5 delivered to the ring gear 18 in the HV-Hi mode may be expressed as "$1/(\rho1+1)$". In the above-expressed expressions, "$\rho1$" is a gear ratio of the power split section 9 (i.e., a ratio between teeth number of the ring gear 12 and teeth number of the sun gear 11), and "$\rho2$" is a gear ratio of the transmission section 10 (i.e., a ratio between teeth number of the ring gear 18 and teeth number of the sun gear 17). Specifically, "$\rho1$" and "$\rho2$" are individually smaller than "1". That is, in the HV-Lo mode, a ratio of the torque delivered to the ring gear 18 is increased in comparison with that in the HV-Hi mode. Accordingly, "$1/(1-(\rho1 \cdot \rho2))$" corresponds to a first predetermined ratio of the embodiment, and "$1/(\rho1+1)$" corresponds to a second predetermined ratio of the embodiment. Further, the ring gear 18 and the driven gear 23 serve as an output member in the embodiment. Here, when the speed of the engine 5 is increased by the torque generated by the engine 5, the output torque of the engine 5 is calculated by subtracting a torque required to increase the speed of the engine 5 from a torque generated by the engine 5. That is, an actual output torque of the output shaft 15 of the engine 5 corresponds to the output torque of the engine 5.

In the HV mode, the electric power generated by the first motor 6 is supplied to the second motor 7, and in addition, the electric power accumulated in the battery 47 is also supplied to the second motor 7 as necessary. In the hybrid vehicle, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained.

Figure 7:
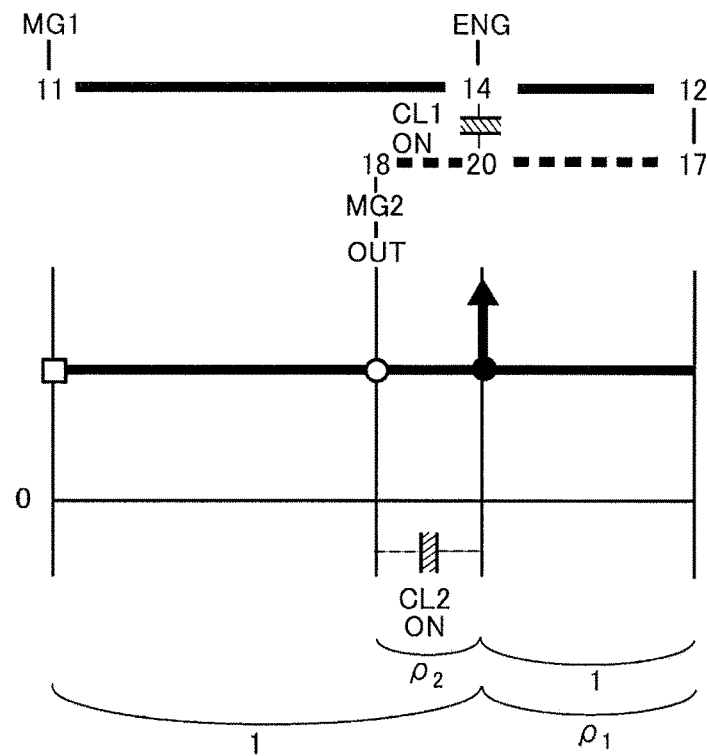
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. In other words, the output power of the engine 5 will not be translated into an electric energy by the first motor 6 and the second motor 7. For this reason, a power loss associated with such energy conversion will not be caused in the fixed mode and hence power transmission efficiency can be improved.

Figure 8:
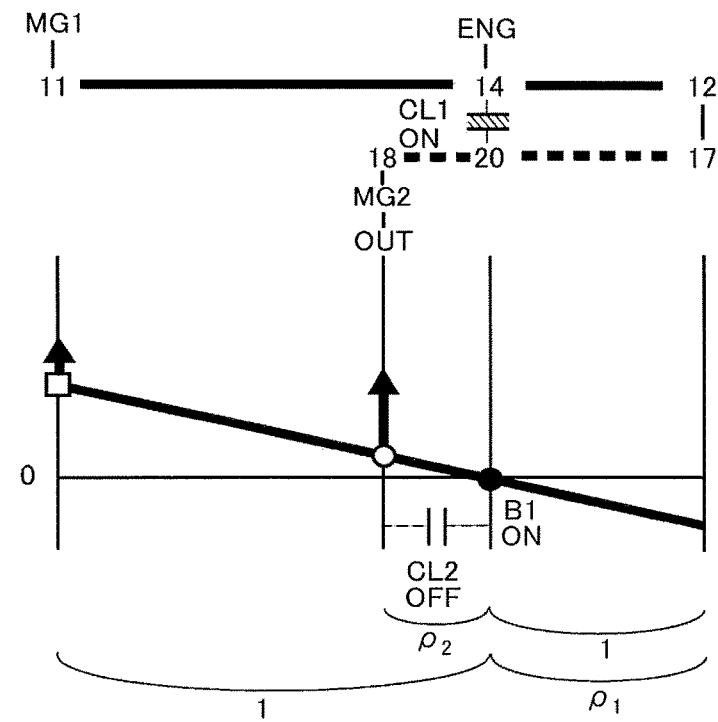
FIG. 8 is a nomographic diagram showing a situation in an EV-Lo mode.
Figure 9:
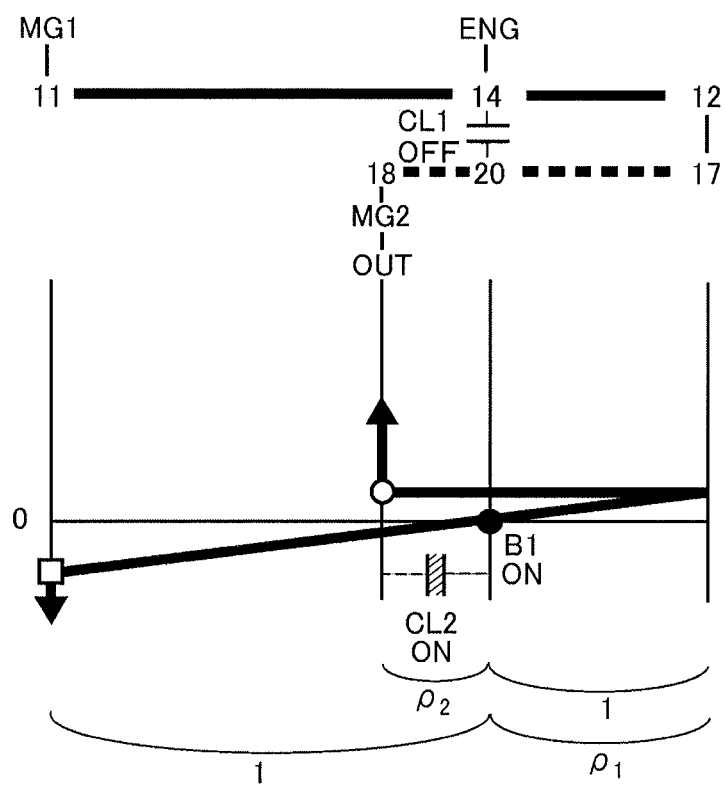
FIG. 9 is a nomographic diagram showing a situation in the EV-Hi mode.
Figure 10:
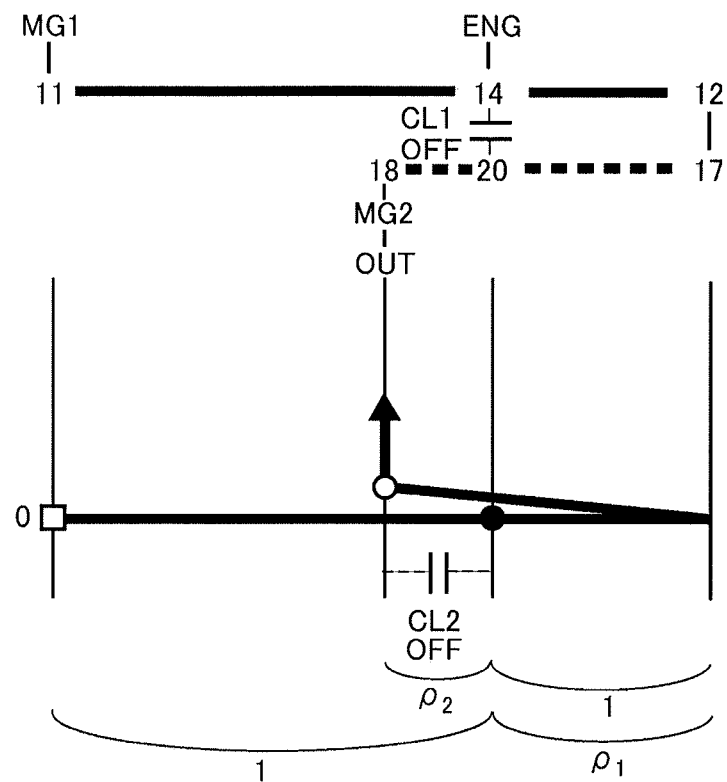
FIG. 10 is a nomographic diagram showing a situation in a single-motor mode.

As indicated in FIGS. 8 and 9, in the EV-Lo mode and the EV-Hi mode, the first brake B1 is engaged, and the first motor 6 and the second motor 7 generates the drive torques to propel the hybrid vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the EV-Lo mode is greater than that in the EV-Hi mode so that a greater drive force is established in the EV-Lo mode. As indicated in FIG. 10, in the single-motor mode, only the second motor 7 generates a drive torque, and both of the clutch CL1 and the second clutch CL2 are disengaged. In the single-motor mode, therefore, all of the rotary elements of the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the hybrid vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
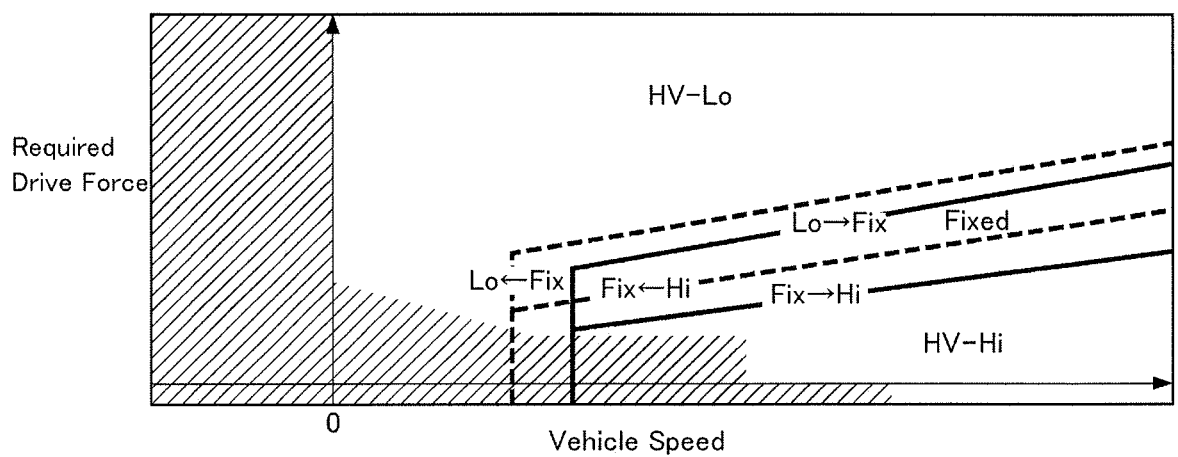
FIG. 11 shows a map for determining an operating mode during propulsion in a CS mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the single-motor mode is selected. In the CS mode, the single-motor mode is selected when the hybrid vehicle is propelled in a forward direction and the required drive force is small (or when decelerating). Such area where the single-motor mode is selected is determined based on specifications of the second motor 7 and the rear motor 30. In principle, the single-motor mode is selected when the hybrid vehicle is propelled in the reverse direction.

During forward propulsion in the CS mode, the HV mode is selected when the large drive force is required. In the HV mode, the drive force may be generated from a low speed range to a high speed range. When the SOC level falls close to a lower limit level, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lo←Fix" line from right to left, or when the operating point is shifted across the "Lo←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 12:
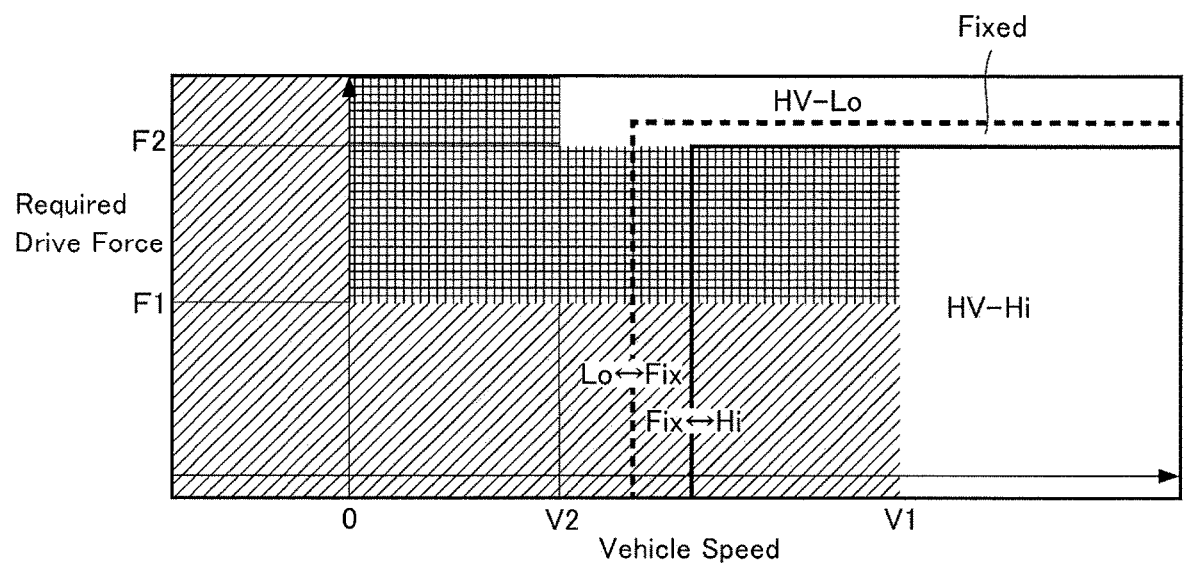
FIG. 12 shows a map for determining an operating mode during propulsion in a CD mode.

FIG. 12 shows an example of a map used to select the operating mode during propulsion in the CD mode. In FIG. 12, the vertical axis also represents the required drive force, and the horizontal axis also represents the vehicle speed.

In FIG. 12, the hatched area is also an area where the single-motor mode is selected. In the CD mode, the single-motor mode is selected when the hybrid vehicle is propelled in a forward direction and the required drive force is smaller than a first threshold force value F1 (or when decelerating). Such area where the single-motor mode is selected is also determined based on specifications of the second motor 7 and the rear motor 30. In principle, the single-motor mode is selected when the hybrid vehicle is propelled in a reverse direction.

During forward propulsion in the CD mode, the dual-motor mode is selected when the drive force larger than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level of the battery 47 falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo→Fix" line. Likewise, the operating mode is shifted between the HV-Hi mode and the fixed mode when the operating point is shifted across the "Fix→Hi".

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

During reverse propulsion, the HV-Hi mode or the HV-Lo mode may be selected when the engine 5 is required to start. Instead, during reverse propulsion, the dual mode may also be established as necessary by engaging the first brake B1 to deliver the output torque of the first motor 6 to the front wheels 1R and 1L.

Rotational speeds of the rotary elements of the power split mechanism 8, and directions of torques of the engine 5, the first motor 6, and the second motor 7 in each operating mode during reverse propulsion except for the fixed mode are indicated in FIGS. 13 to 17. If the fixed mode is selected during reverse propulsion, the wheels are rotated in the opposite direction to the rotational direction of the engine 5. Therefore, the fixed mode will not be selected during reverse propulsion. If the one-way-clutch is used in place of the first brake B1, the one-way-clutch cannot receive a reaction force against the output torque of the first motor 6 to propel the vehicle in the reverse direction. Therefore, the dual-motor mode will not be selected when the one-way-clutch is used in place of the first brake B1.

Figure 13:
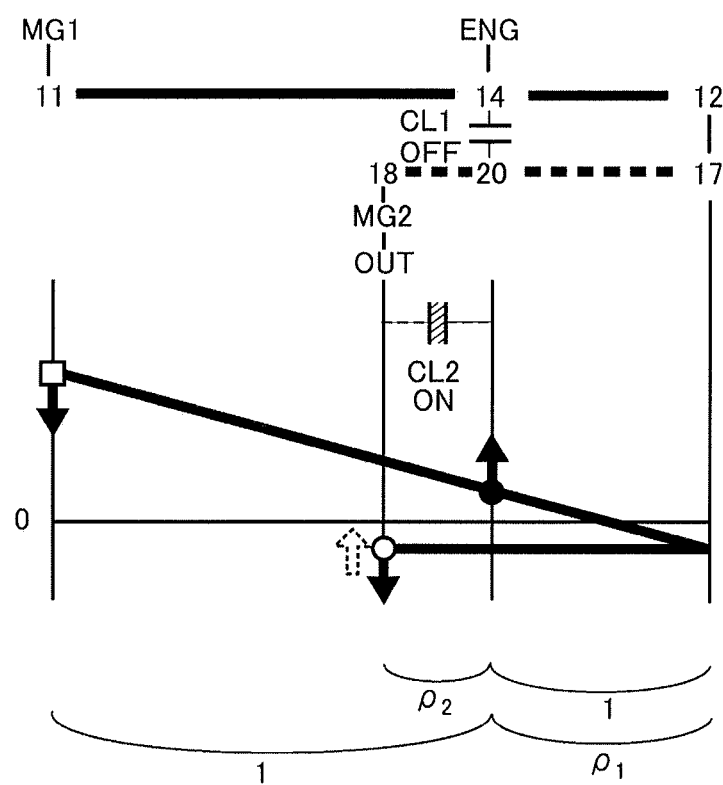
FIG. 13 is a nomographic diagram showing a situation during reverse propulsion in the HV-Hi mode.

FIG. 13 shows a nomographic diagram during reverse propulsion in the HV-Hi mode. In this case, the engine 5 generates a torque in the direction to propel the vehicle in the forward direction, and the first motor 6 generates a reaction torque also in the direction to propel the vehicle in the forward direction so as to maintain the rotational speed of the engine 5 to a target speed. In this situation, the engine torque is transmitted mechanically to the front wheels 1R and 1L through the power split mechanism 8 in the direction indicated by the dashed arrow. In the following description, the engine torque thus mechanically transmitted from the engine 5 to the front wheels 1R and 1L will be called the "mechanically-transmitted" torque. A direction of the mechanically-transmitted torque is opposite to the direction of the torque to propel the vehicle in the reverse direction. In this case, therefore, the second motor 7 generates a total torque of a required torque to achieve the required driving force and a torque corresponding to the mechanically-transmitted torque, in a direction opposite to that of the torque to propel the vehicle in the forward direction. The torque thus generated by the second motor 7 during reverse propulsion corresponds to a "reverse torque" in the embodiment.

Figure 14:
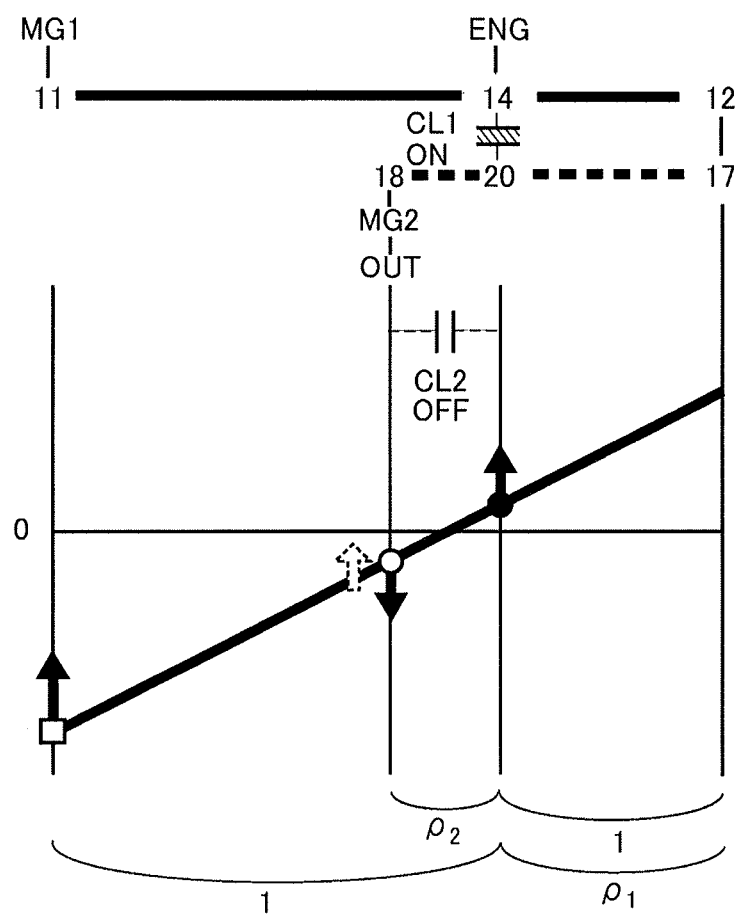
FIG. 14 is a nomographic diagram showing a situation during reverse propulsion in the HV-Lo mode.

As indicated in FIG. 14, during reverse propulsion in the HV-Lo mode, the engine 5 and the first motor 6 generate the torques in the same direction as the case of propelling the vehicle in the forward direction, and the second motor 7 generates torques in the opposite direction to opposite to that of the torque to propel the vehicle in the forward direction.

Figure 15:
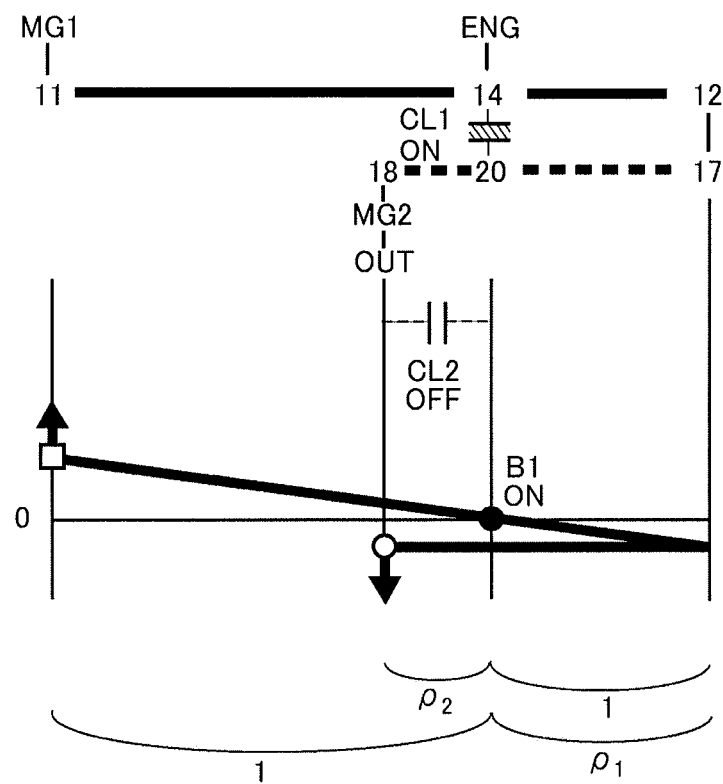
FIG. 15 is a nomographic diagram showing a situation during reverse propulsion in the EV-Hi mode.
Figure 16:
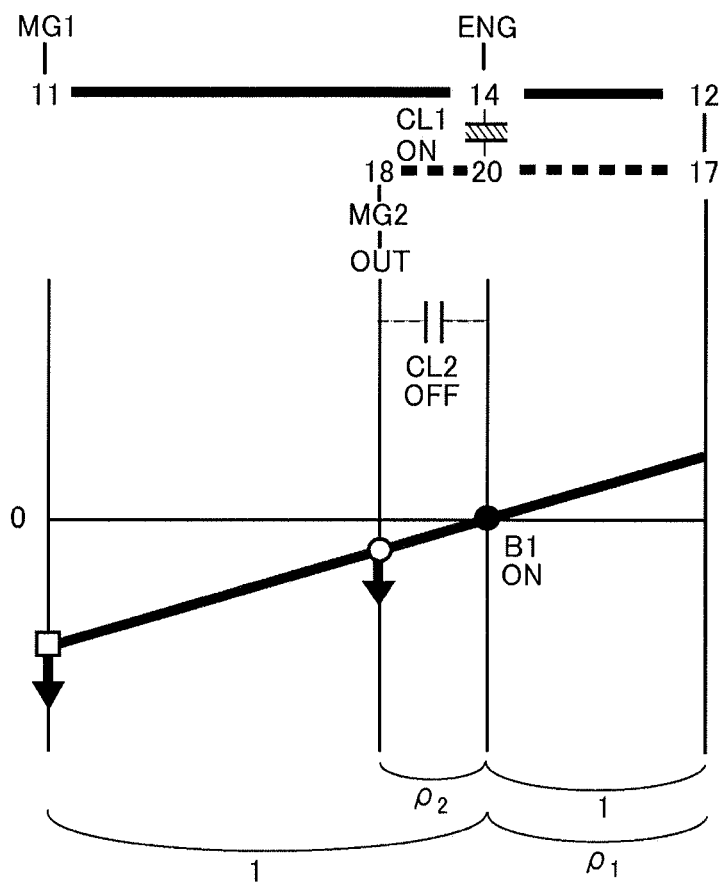
FIG. 16 is a nomographic diagram showing a situation during reverse propulsion in the EV-Lo mode.
Figure 17:
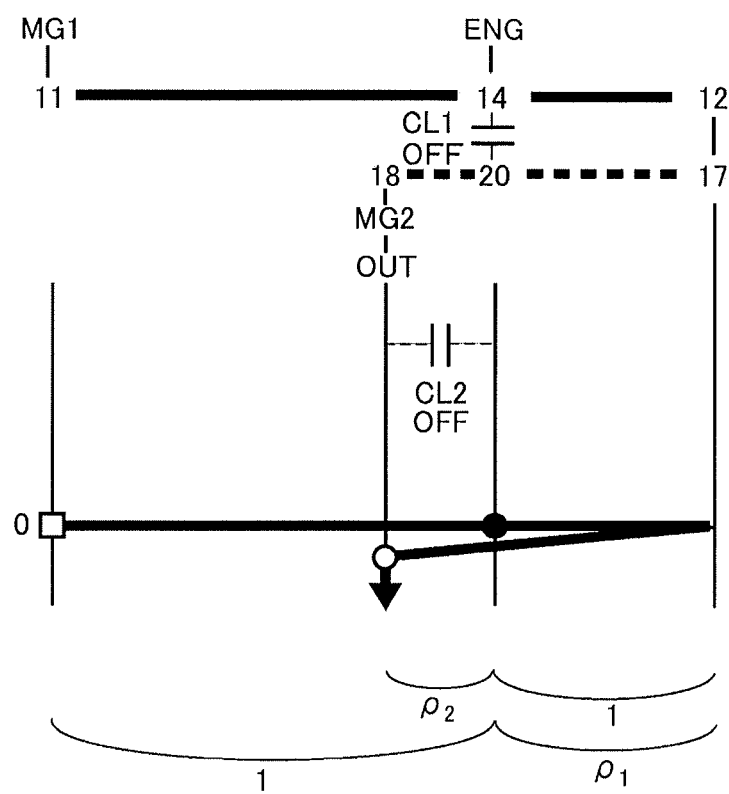
FIG. 17 is a nomographic diagram showing a situation during reverse propulsion in the single-motor mode.

As indicated in FIGS. 15 to 17, during reverse propulsion in the EV-Hi mode, the EV-Lo mode, and the single-motor mode, the first motor 6 and the second motor 7 generates torques in the opposite direction to opposite to that of the torque to propel the vehicle in the forward direction.

Figure 18:
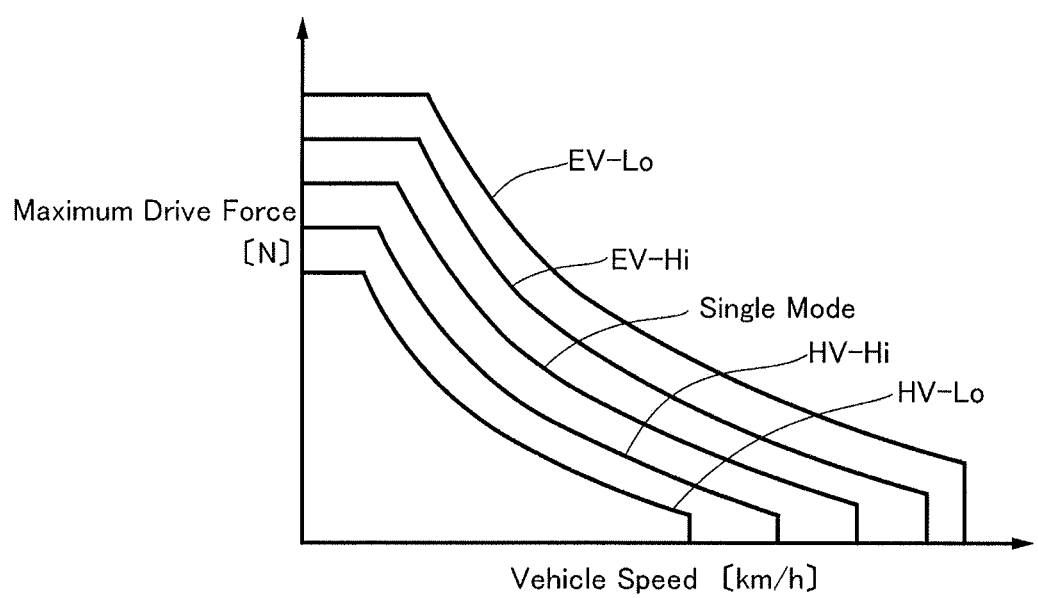
FIG. 18 is a graph showing a maximum drive force during reverse propulsion in each operating mode.

Here will be explained maximum drive forces in each mode during reverse propulsion with reference to FIG. 18. In FIG. 18, the vertical axis represents the maximum drive force, and the horizontal axis represents the vehicle speed. Since the vehicle is propelled by both of the first motor 6 and the second motor 7 in the dual-motor mode, the maximum drive force in the dual-motor mode is greater than that in the single-motor mode. As described, the speed reducing ratio in the EV-Lo mode is greater than that in the EV-Hi mode, and hence the multiplying factor of the torque of the first motor 6 transmitted to the front wheels 1R and 1L is greater than that in the EV-Hi mode. In the dual-motor mode, therefore, the maximum drive force in the EV-Lo mode is greater than that in the EV-Hi mode.

As indicated in FIGS. 13 and 14, in the HV mode, the direction of the mechanically-transmitted torque is opposite to the direction of the torque delivered to the front wheels 1R and 1L. That is, in the HV mode, even if the second motor 7 generates the maximum torque, the mechanically-transmitted torque is subtracted from the output torque of the second motor 7 to be delivered to the front wheels 1R and 1L. For this reason, the maximum drive forces in the HV mode are smaller than that in the single-motor mode.

As described, the ratio of the torque of the engine 5 delivered to the output side of the power split mechanism 8 in the HV-Lo mode is greater than that in the HV-Hi mode. That is, the mechanically-transmitted torque is greater in the HV-Lo mode than that in the HV-Hi mode. For this reason, the maximum drive force in the HV-Hi mode is greater than that in the HV-Lo mode.

For example, the engine 5 is required to be activated when generating a power to propel the vehicle, when charging the battery 47, when warming up the purifying device 5b. For these purposes, the HV mode is selected in those cases, and an output torque of the engine 5 will not be change in the HV-Hi mode and the HV-Lo mode.

As described, during reverse propulsion, the maximum drive force may be reduced in the HV-Lo mode. In addition, in the HV-Lo mode, the above-explained mechanically-transmitted torque is increased and hence a required torque for the second motor 7 is increased. That is, an electric consumption is also increased in the HV-Lo mode. In order to avoid such disadvantages, according to the embodiment, the control system is configured to restrict selection of the HV-Lo mode when the engine 5 has to be started while propelling the vehicle in the reverse direction.

Figure 19:
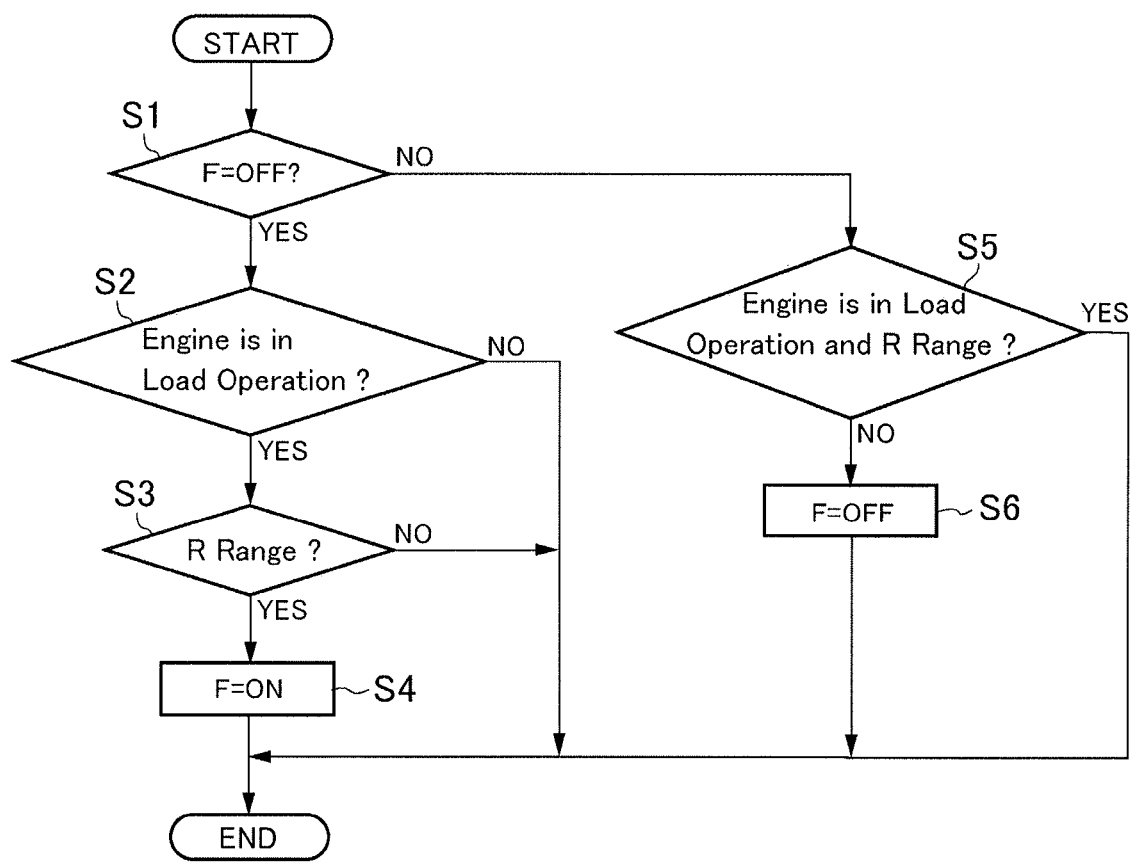
FIG. 19 is a flowchart showing one example of a routine executed by the control system according to the embodiment.

To this end, the control system executes a routine shown in FIG. 19. At step S1, it is determined whether or not a restriction flag F is turned off. Specifically, the restriction flag F is turned on when restricting selection of the HV-Lo mode (at step S4), and turned on when cancelling the restriction of selection of the HV-Lo mode, in other words, when allowing selection of the HV-Lo mode (at step S7).

If the restriction flag F is turned off so that the answer of step S1 is YES, it is determined whether it is necessary to restrict selection of the HV-Lo mode. Specifically, at step S2, it is determined whether the engine 5 is in load operation in which the engine 5 is driven at a speed higher than an idling speed to generate power greater than a predetermined power. For example, such determination at step S2 can be made by determining whether an amount of an air/fuel mixture burnt in the engine 5 is greater than a predetermined amount. Instead, the determination at step S2 may also be made without determining an actual operating condition of the engine 5. For instance, the load operation of the engine 5 may also be determined upon satisfaction of one of the following conditions.

A first condition is that a drive power as a product of a vehicle speed and a drive force is greater than a predetermined power. The drive power becomes positive value when propelling the vehicle in the forward direction, and becomes negative value when propelling the vehicle in the reverse direction. Specifically, the first condition is satisfied when the operating point falls outside of a region where the EV mode is selected in the maps shown in FIG. 11 or 12 to achieve the required drive power. That is, the predetermined power is set to an upper limit power achieved in the EV mode.

A second condition is that an output of the drive system is greater than a predetermined output value. Specifically, the output of the drive system is a total output of the prime movers such as the engine 5, the first motor 6, and the second motor 7. The total output of the prime movers includes a power required to propel the vehicle, a power required to charge the battery 47, and a power required to drive an oil pump (not shown) and so on. As described, each of the first motor 6 and the second motor 7 may be operated individually as a generator. In this case, the total output of the prime movers may be calculated by subtracting an electric power regenerated by the motor from the output power to propel the vehicle. Specifically, the total output may be calculated based on signals transmitted from the main ECU 49 to the motor ECU 50 and the engine ECU 51, and the predetermined value may be set to a value at which the engine 5 has to be started to achieve the total output.

A third condition is that a required drive force is greater than a predetermined force value. In this case, the load operation of the engine 5 may be determined based on a fact that the HV-Hi mode or the HV-Lo mode is selected to achieve the required drive force. Specifically, the operating point falls outside of the region where the EV mode is selected in the maps shown in FIG. 11 or 12 to achieve the required drive force. Here, maximum available output torques of the first motor 6 and the second motor 7 are reduced with an increase in a rotational speed of each motor, therefore, the predetermined force value may be altered depending on a vehicle speed. Instead, the required drive force may also be determined based on a position of the accelerator pedal.

A fourth condition is that an SOC level of the battery 47 is lower than a predetermined SOC level, and a fifth condition is that a voltage of the battery 47 is lower than a predetermined voltage. In those cases, the engine 5 is in the load operation to charge the battery 47. Specifically, the predetermined SOC level is set to a lower limit SOC level, and the predetermined voltage is set to a maximum available output voltage at the lower limit SOC level.

In principle, during propulsion in the HV-Hi mode or the HV-Lo mode, the first motor 6 is operated as a generator to establish a reaction torque. The first motor 6 is also operated as a generator when charging the battery 47 while operating the engine 5. For these reasons, the load operation of the engine 5 may also be determined based on a fact that the first motor 6 is operated as a generator, instead of satisfaction of the fourth condition or the fifth condition.

A sixth condition is that a rapid launching of the vehicle is required. When launching the vehicle promptly utilizing an inertial torque of the engine 5, the vehicle is launched by depressing the accelerator pedal and a brake pedal simultaneously to increase an engine speed to a certain level, and then reducing a pedal force applied to the brake pedal. In this case, the load operation of the engine 5 may be determined based on a fact that the accelerator pedal and the brake pedal are depressed simultaneously.

A seventh condition is that warm-up of the purification device 5b is required to enhance purifying performance, and an eighth condition is that the defroster 5c is in operation. Specifically, a demand to warm-up the purification device 5b may be determined based on a fact that a temperature of the purifying device 5b is lower than a predetermined temperature, and an operation of the defroster 5c may be determined based on a fact that a switch to activate the defroster 5c is turned on.

If the engine 5 is not in the load operation so that the answer of step S2 is NO, the routine returns. In this case, the mechanically-transmitted torque will not be transmitted to the front wheels 1R and 1L even if the vehicle is propelled in the reverse direction. That is, the maximum drive force will not be reduced even if the vehicle is propelled in the reverse direction. For this reason, the routine returns without executing the subsequent steps.

By contrast, if the engine 5 is in the load operation so that the answer of step S2 is YES, the routine progresses to step S3 to determine whether an operating range is in a reverse range (referred to as R range in FIG. 19) based e.g., on a position of a shift lever.

If the operating range is not in the reverse range so that the answer of step S3 is NO, the routine returns. In this case, the mechanically-transmitted torque will not be transmitted to the front wheels 1R and 1L, and hence the maximum drive force will not be reduced even if the vehicle is propelled in the current condition.

By contrast, if the operating range is in the reverse range so that the answer of step S3 is YES, the mechanically-transmitted torque is transmitted to the front wheels 1R and 1L thereby reducing the maximum drive force. In this case, in order to prevent such reduction in the maximum drive force by reducing the mechanically-transmitted torque to the front wheels 1R and 1L, the routine progresses to step S4 to turn on the restriction flag F. Thereafter, the routine returns.

Thus, the HV-Lo mode is restricted when the operating range is shifted to the reverse range while operating the engine 5, or when the engine 5 is required to be started during propulsion in the reverse range. That is, the selection of the HV-Lo mode is not restricted based on a fixed criterion. For example, reduction on the maximum drive force may also be reduced even in the HV-Lo mode by maintaining the engine speed to the idling speed. In this case, the first motor 6 does not have to establish a reaction torque, and hence the mechanically-transmitted torque will not be transmitted to the front wheels 1R and 1L.

Otherwise, if the restriction flag F is turned on so that the answer of step S1 is NO, the routine progresses to step S5 to determine whether the restriction flag F can be turned off. At step S5, specifically, it is determined whether the engine 5 is in the load operation, and the operating range is in the reverse mode. Such determination at step S5 may be made by the same procedures as the steps S2 and S3. If the load operation of the engine 5 is determined based on one of the above-mentioned first to seventh conditions, it is preferable to set the predetermined values in such a manner as to prevent a hunting of the restriction flag F. Specifically, it is preferable to reduce the predetermined power, the predetermined output value, and the predetermined force value smaller than those employed at step S2, and to increase the predetermined SOC level, the predetermined voltage, and the predetermined temperature greater than those employed at step S2.

If the engine 5 is in the load operation and the operating range is in the reverse mode so that the answer of step S5 is YES, the routine returns while keeping the restriction flag F tuned on. By contrast, if the engine 5 is not in the load operation and the operating range is not in the reverse mode, or if any of those conditions is not satisfied so that the answer of step S5 is NO, the maximum drive force will not be reduced. In this case, therefore, the routine progresses to step S6 to turn off the restriction flag F, and thereafter returns.

Figure 20:
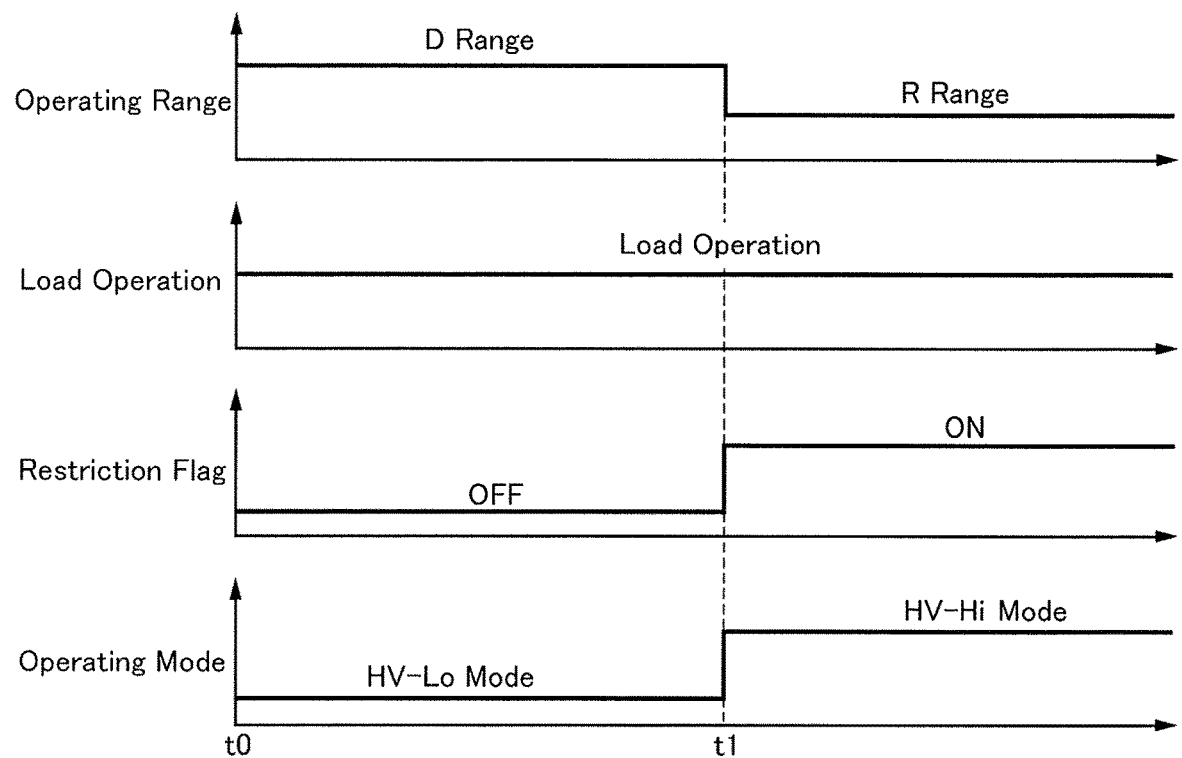
FIG. 20 is a time chart showing a temporal change in a restriction flag during execution of the routine shown in FIG. 19.

Temporal change in the restriction flag F during execution of the routine shown in FIG. 19 is shown in FIG. 20. Specifically, FIG. 20 shows an example in which the operating range is shifted from a drive range (referred to as D range in FIG. 20) to the reverse range (referred to as R range in FIG. 20) while the engine 5 is in the load operation in the HV-Lo mode. In this situation, the routine progresses from step S2 to step S3 but the answer of step S3 is NO, therefore, the restriction flag F is not turned on to maintain the HV-Lo mode.

At point t1, the operating range is shifted from the drive range to the reverse range, and the engine 5 is still in the load operation. In this situation, the routine progresses from step S3 to step S4 so that the restriction flag F is turned on. Consequently, the operating mode is shifted from the HV-Lo mode to the HV-Hi mode.

Here will be briefly explained a shifting control of the operating mode from the HV-Lo mode to the HV-Hi mode to be carried out when the operating range is shifted to the reverse range during propulsion in the HV-Lo mode while the engine 5 is in the load operation, or when the load operation of the engine 5 is required during reverse propulsion in the HV-Lo mode in order to establish the HV-Lo mode, first of all, the first clutch CL1 is disengaged to bring the power split mechanism 8 into the neutral condition. Then, a rotational speed of the carrier 20 is synchronized with a rotational speed of the ring gear 18 in the transmission section 10 by controlling a rotational speed of the first motor 6, and the second clutch CL2 is engaged. During execution of the shifting control, the drive force may be changed due to changes in speeds of the engine 5 and the first motor 6. In order to suppress such change in the drive force, a required drive torque of the second motor 7 is changed in a calculated amount of the change in the drive force.

Thus, according to the embodiment, the selection of the HV-Lo mode is restricted during reverse propulsion while operating the engine 5. According to the embodiment, therefore, the mechanically-transmitted torque transmitted to the front wheels 1R and 1L can be reduced thereby preventing a reduction in the maximum drive force during propulsion in the reverse direction. During reverse propulsion, the vehicle may be propelled in the HV-Lo mode if the required drive force is relatively small. In this case, however, the second motor 7 has to generate a larger torque to achieve the required drive force. In order to avoid such increase in the output torque of the second motor 7, according to the embodiment, the HV-Hi mode is selected when operating the engine 5 during reverse propulsion. For this reason, an electric consumption to operate the second motor 7 will not be increased. In addition, the ratio of the torque delivered to the first motor side is increased in the HV-Hi mode so that a generation amount of the first motor 6 is increased. That is, if a larger torque has to be generated by the second motor 7 during reverse propulsion in the HV-Hi mode, a larger amount of the electricity can be supplied to the second motor 7 from the first motor 6. For this reason, a consumption of the electricity accumulated in the battery 47 can be reduced in the HV-Hi mode.

By thus executing the routine shown in FIG. 19, selection of the HV-Lo mode can be restricted when the operating range is shifted from the drive range to the reverse range while the engine 5 is in the load operation. In other words, the selection of the HV-Lo mode will not be restricted during forward propulsion, and hence running performance of the vehicle will not be reduced during forward propulsion.

In addition, selection of the HV-Lo mode can be restricted when the operating condition of the engine 5 is switched from a no-load operation to the load operation during propulsion in the reverse range. That is, selection of the HV-Lo mode can be restricted when the operating range is shifted to the reverse range even if the engine 5 is in the no-load operation. For this reason, a reduction in the maximum drive force during propulsion in the reverse direction can be prevented.

The drive force control system may be further configured to restrict selection of the HV-Lo mode if the load operation of the engine 5 is expected, or if the operating range is expected to be shifted to the reverse range. In this case, at step S2, it is determined whether the engine 5 is expected to be in the load operation, and at step S3, it is determined whether the operating range is expected to be shifted to the reverse range. In this case, an expectation of the load operation of the engine 5 may also be determined based on the above-explained first to seventh conditions. In this case, in order to ensure a time until an actual commencement of the load operation of the engine 5, it is preferable to reduce the predetermined power, the predetermined output value, and the predetermined force value smaller than those employed at step S2, and to increase the predetermined SOC level, the predetermined voltage, and the predetermined temperature greater than those employed at step S2.

In this case, the load operation of the engine 5 can be prevented certainly during reverse propulsion in the HV-Lo mode to prevent a temporal reduction in the drive force. In addition, by thus restricting selection of the HV-Lo mode when the operating range is expected to be shifted to the reverse range, the operating mode can be shifted from the HV-Lo mode to the HV-Hi mode when the vehicle previously propelling in the forward direction starts propelling in the reverse direction after stopping. That is, it is unnecessary to shift the operating range during reverse propulsion. For this reason, a temporal reduction in the drive force due to mode change during reverse propulsion can be prevented, and hence shocks can be reduced to prevent the driver to feel uncomfortable feeling.

Although the above exemplary embodiments of the present application have been described, it will be understood by those skilled in the art that the present application should not be limited to the described exemplary embodiments, and various changes and modifications can be made within the spirit and scope of the present application. For example, the hybrid vehicle according to the embodiment may be modified as long as two different operating modes can be selected to alter the ratio of the torque delivered to the first motor and to the output member, and the mechanically-transmitted torque acts in the direction to reduce the drive force to propel the vehicle in the reverse direction. Hereinafter, modification examples of the hybrid vehicle will be explained with reference to FIGS. 21 to 26. In the following explanation, common reference numerals are allotted to in common with those of the foregoing embodiment, and detailed explanation for the common elements will be omitted.

Figure 21:
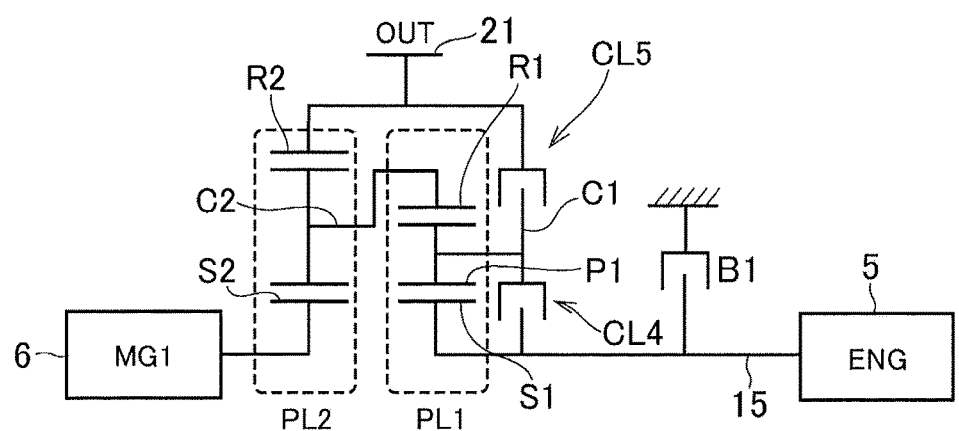
FIG. 21 is a skeleton diagram showing a structure of the hybrid vehicle according to another embodiment.

The hybrid vehicle shown in FIG. 21 comprises a first differential mechanism PL1 connected directly to the engine 5, and a second differential mechanism PL2 connected directly to the first motor 6.

The first differential mechanism PL1 is a single-pinion planetary gear unit comprising: a sun gear S1 formed around the output shaft 15 of the engine 5; a ring gear R1 arranged concentrically with the sun gear S1; pinion gears P1 interposed between the sun gear S1 and the ring gear R1 while being meshed with both gears S1 and R1; and a carrier C1 supporting the pinion gears P1 in a rotatable manner.

The second differential mechanism PL2 is also a single-pinion planetary gear unit comprising: a sun gear S2 connected to the first motor 6; a carrier C2 connected to the ring gear R1 of the first differential mechanism PL1; and a ring gear R2 connected to the output gear 21. The output gear 21 is meshed with the driven gear 23 to distribute the torque to the front wheels 1R and 1L.

In the first differential mechanism PL1, the sun gear S1 and the carrier C1 are engaged to each other through a fourth clutch CL4 to rotate the rotary elements of the first differential mechanism PL1 integrally. The carrier C1 of the first differential mechanism PL1 and the ring gear R2 of the second differential mechanism PL2 are engaged to each other through a fifth clutch CL5. The brake B1 is disposed on the output shaft 15 of the engine 5. For example, a friction clutch and a dog clutch may also be used individually as the clutches CL4 and CL5.

In the hybrid vehicle shown in FIG. 21, the HV-Hi mode is established by engaging the fourth clutch CL4, and the HV-Lo mode is established by engaging the fifth clutch CL5.

Figure 22:
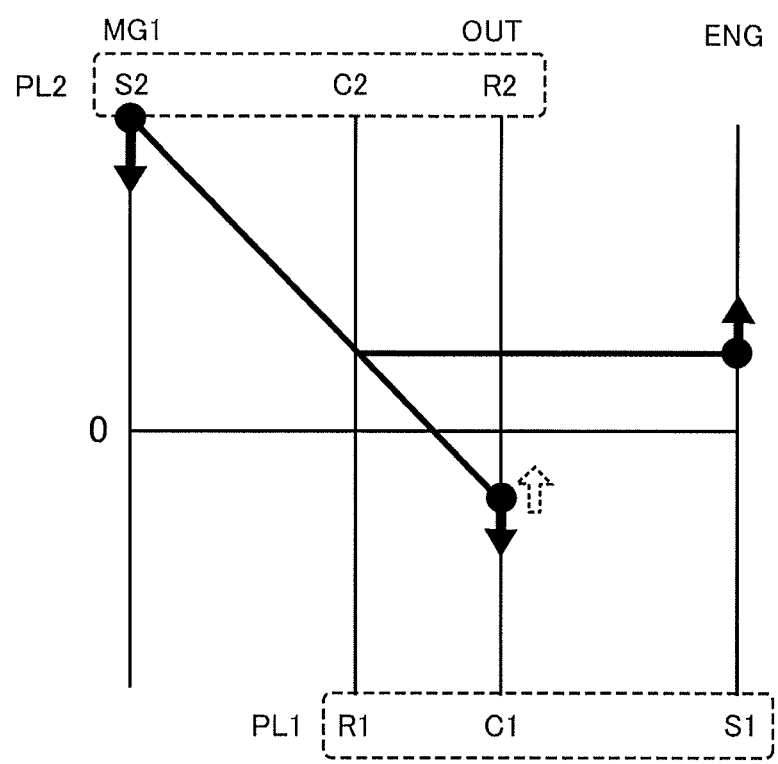
FIG. 22 is a nomographic diagram showing a situation of the hybrid vehicle shown in FIG. 21 in the HV-Hi mode.

FIG. 22 indicates rotational speeds of the rotary elements of the first differential mechanism PL1 and the second differential mechanism PL2 in the HV-Hi mode of the hybrid vehicle shown in FIG. 21. As shown in FIG. 22, the HV-Hi mode is established by engaging the fourth clutch CL4 so that the rotary elements in the first differential mechanism PL1 are rotated integrally. Consequently, the carrier C2 as an input element of the second differential mechanism PL2 is rotated at a same speed as the engine 5. In the HV-Hi mode, when the engine 5 is in the load operation, the sun gear S2 of the second differential mechanism PL2 is allowed to serve as a reaction element by applying reaction torque thereto from the first motor 6 so as to maintain the rotational speed of the engine 5 to a predetermined speed. Consequently the ring gear R2 of the second differential mechanism PL2 is allowed to serve as an output element to deliver the torque to the output gear 21.

Figure 23:
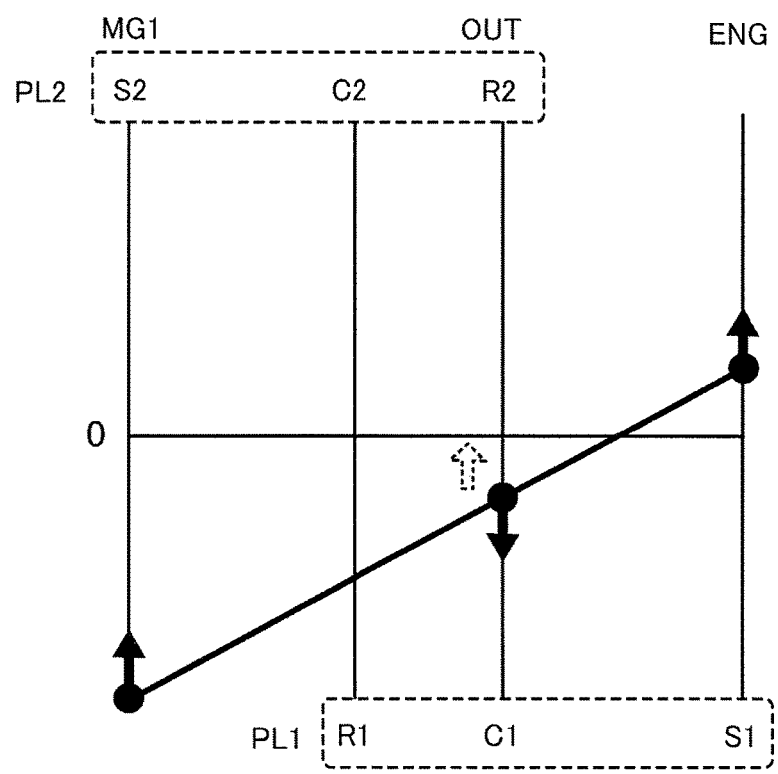
FIG. 23 is a nomographic diagram showing a situation of the hybrid vehicle shown in FIG. 21 in the HV-Lo mode.

FIG. 23 indicates rotational speeds of the rotary elements of the first differential mechanism PL1 and the second differential mechanism PL2 in the HV-Lo mode of the hybrid vehicle shown in FIG. 21. As shown in FIG. 23, the HV-Lo mode is established by engaging the fifth clutch CL5 so that the carrier C1 of the first differential mechanism PL1 and the ring gear R2 of the second differential mechanism PL2 are rotated integrally. In addition, the carrier C2 of the second differential mechanism PL2 is connected to the ring gear R1 of the first differential mechanism PL1. In the HV-Lo mode, when generating a torque by the first motor 6 to maintain the speed of the engine 5 to a predetermined speed while the engine 5 is in the load operation, the sun gear S1 of the first differential mechanism PL1 serves as an input element, the sun gear S2 of the second differential mechanism PL2 serves as a reaction element, and the ring gear R2 of the second differential mechanism PL2 serves as an output element. In the HV-Lo mode, specifically, the torque of the sun gear S1 of the first differential mechanism PL1 is delivered to the rig gear R2 of the second differential mechanism PL2.

As described, in the hybrid vehicle shown in FIG. 21, the HV mode is established by engaging any one of the fourth clutch CL4 and the fifth clutch CL5. In addition, the ratio of the torque delivered from the engine 5 to the ring gear R2 in the HV-Lo mode is greater than that in the HV-Hi mode, and when the load operation of the engine 5 is started during the reverse propulsion, the mechanically-transmitted torque acts in the direction to reduce the drive force to propel the vehicle in the reverse direction. In the hybrid vehicle shown in FIG. 21, therefore, it is preferable to restrict selection of the HV-Lo mode during reverse propulsion to prevent reduction in the maximum drive force.

Figure 24:
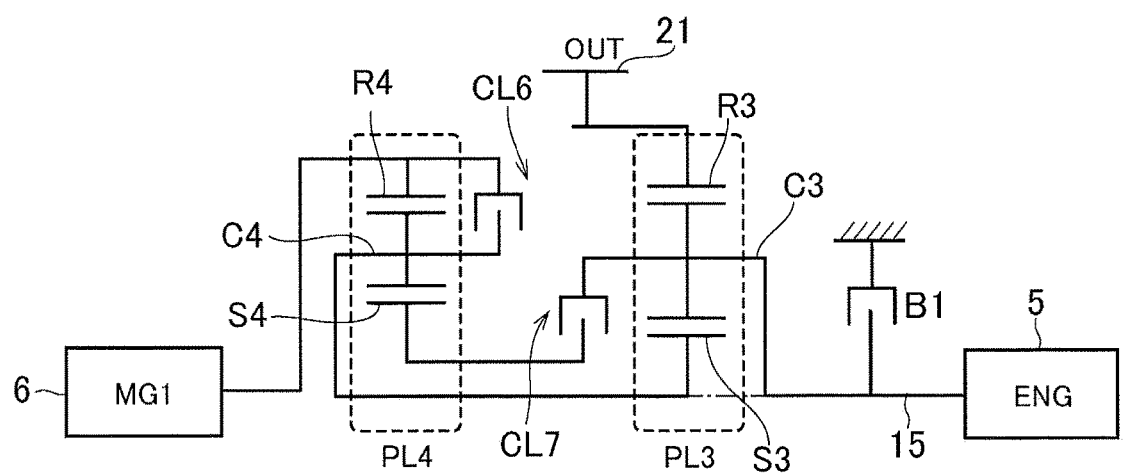
FIG. 24 is a skeleton diagram showing a structure of the hybrid vehicle according to still another embodiment.

The hybrid vehicle shown in FIG. 24 comprises a third differential mechanism PL3 connected directly to the engine 5, and a fourth differential mechanism PL4 connected directly to the first motor 6.

The third differential mechanism PL3 is also a single-pinion planetary gear unit comprising: a carrier C3 connected to the output shaft 15 of the engine 5; a sun gear S3; and a ring gear R3 connected to the output gear 21. The output gear 21 is also meshed with the driven gear 23 to distribute the torque to the front wheels 1R and 1L.

The fourth differential mechanism PL4 is also a single-pinion planetary gear unit comprising: a ring gear R4 connected to the first motor 6; a carrier C4 connected to the sun gear S3 of the third differential mechanism PL3; and a sun gear S4.

In the fourth differential mechanism PL4, the carrier C4 and the ring gear R4 are engaged to each other through a sixth clutch CL6 to rotate the rotary elements of the fourth differential mechanism PL4 integrally. The carrier C3 of the third differential mechanism PL3 and the sun gear S4 of the fourth differential mechanism PL4 are engaged to each other through a seventh clutch CL7. The brake B1 is also disposed on the output shaft 15 of the engine 5. For example, a friction clutch and a dog clutch may also be used individually as the clutches CL6 and CL7.

In the hybrid vehicle shown in FIG. 24, the HV-Hi mode is established by engaging the sixth clutch CL6, and the HV-Lo mode is established by engaging the seventh clutch CL7.

Figure 25:
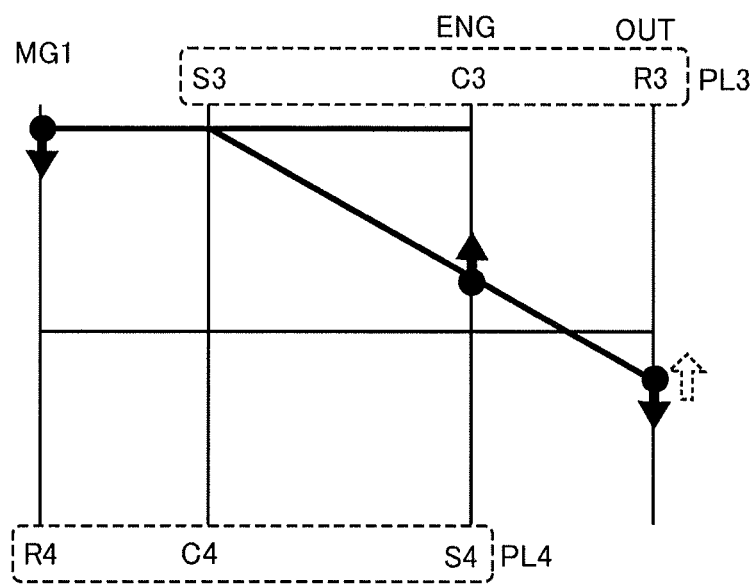
FIG. 25 is a nomographic diagram showing a situation of the hybrid vehicle shown in FIG. 24 in the HV-Lo mode.

FIG. 25 indicates rotational speeds of the rotary elements of the third differential mechanism PL3 and the fourth differential mechanism PL4 in the HV-Hi mode of the hybrid vehicle shown in FIG. 24. As shown in FIG. 25, the HV-Hi mode is established by engaging the sixth clutch CL6 so that the rotary elements in the fourth differential mechanism PL4 are rotated integrally. Consequently, the torque of the first motor 6 is delivered to the carrier C4 of the fourth differential mechanism PL4 without being changed. In the HV-Hi mode, when the engine 5 is in the load operation, a reaction torque established by the first motor 6 is delivered to the sun gear S3 of the third differential mechanism PL3 through the carrier C4 of the fourth differential mechanism PL4 so as to maintain the rotational speed of the engine 5 to a predetermined speed. Consequently, the torque is delivered from the ring gear R3 to the output gear 21. Thus, in the HV-Hi mode, the carrier C3 serves as an input element, the sun gear S3 serves as a reaction element, and the ring gear R3 serves as an output element.

Figure 26:
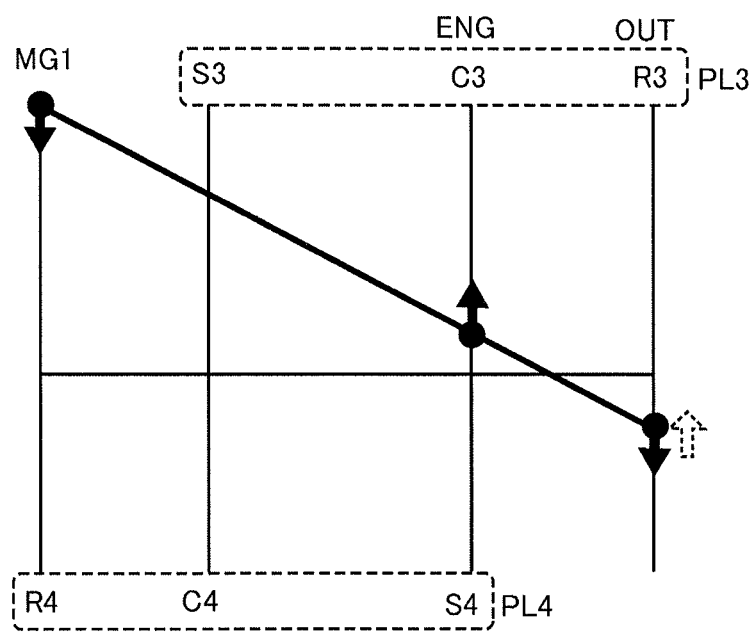
FIG. 26 is a nomographic diagram showing a situation of the hybrid vehicle shown in FIG. 24 in the HV-Hi mode.

FIG. 26 indicates rotational speeds of the rotary elements of the third differential mechanism PL3 and the fourth differential mechanism PL4 in the HV-Lo mode of the hybrid vehicle shown in FIG. 24. As shown in FIG. 26, the HV-Lo mode is established by engaging the seventh clutch CL7 so that the carrier C3 of the third differential mechanism PL3 and the sun gear S4 of the fourth differential mechanism PL4 are rotated integrally. In addition, the sun gear S3 of the third differential mechanism PL3 is connected to the carrier C4 of the fourth differential mechanism PL4. In the HV-Lo mode, when generating a torque by the first motor 6 to maintain the speed of the engine 5 to a predetermined speed while the engine 5 is in the load operation, the carrier C3 of the third differential mechanism PL3 serves as an input element, the ring gear R4 of the fourth differential mechanism PL4 serves as a reaction element, and the ring gear R3 of the third differential mechanism PL3 serves as an output element. In the HV-Lo mode, specifically, the torque of the carrier C3 of the third differential mechanism PL3 is delivered to the rig gear R3 of the third differential mechanism PL3.

As described, in the hybrid vehicle shown in FIG. 24, the HV mode is established by engaging any one of the sixth clutch CL6 and the seventh clutch CL7. In addition, the ratio of the torque delivered from the engine 5 to the ring gear R3 in the HV-Lo mode is greater than that in the HV-Hi mode, and when the load operation of the engine 5 is started during the reverse propulsion, the mechanically-transmitted torque acts in the direction to reduce the drive force to propel the vehicle in the reverse direction. In the hybrid vehicle shown in FIG. 24, therefore, it is preferable to restrict selection of the HV-Lo mode during reverse propulsion to prevent reduction in the maximum drive force.

Thus, in the hybrid vehicles shown in FIGS. 1, 26, and 29, the first differential mechanism is adapted to perform a differential action among a first rotary element connected to an engine; a second rotary element connected to a motor; and a third rotary element connected to drive wheels. The second differential mechanism is also adapted to perform a differential action among: a fourth rotary element; a fifth rotary element connected to the third rotary element; and a sixth rotary element. Each of the hybrid vehicles individually comprises: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element. In the hybrid vehicles, a first mode (i.e., the HV-Lo mode) in which a torque distribution ratio is relatively large is established by engaging any one of the first engagement device and the second engagement device, and a second mode (i.e., the HV-Hi mode) in which a torque distribution ratio is relatively small is established by engaging other one of the first engagement device and the second engagement device.

What is claimed is:

1. A drive force control system for a hybrid vehicle, comprising:
   an engine;
   a first rotary machine;
   a transmission mechanism in which a first rotary element connected to the engine, a second rotary element connected to the first rotary machine, and a third rotary element connected to an output member are connected to one another to perform a differential action, in which a torque delivered from the engine is transmitted therethrough to the output member by establishing a reaction torque by the first rotary machine, and in which an operating mode can be selected from a first mode in which the output torque of the engine is delivered to the output member side at a first predetermined ratio and a second mode in which the output torque of the engine is delivered to the output member side at a second predetermined ratio that is smaller than the first predetermined ratio; and
   a second rotary machine that is connected to the output member to transmit a torque to the output member,
   wherein the hybrid vehicle is propelled in a reverse direction by a reverse torque generated by the second rotary machine,
   wherein a torque delivered from the engine to the output member through the transmission mechanism during operation of the engine is applied in a direction opposing the reverse torque, and
   wherein the drive force control system comprises a controller to control the transmission mechanism, that is configured to prevent selection of the first mode when the engine is in load operation where the engine is driven at a speed higher than an idling speed during propulsion of the hybrid vehicle in the reverse direction.

2. The drive force control system for a hybrid vehicle as claimed in claim 1, wherein the controller is further configured to determine that the engine is in load operation where the engine is driven at a speed higher than the idling speed based on any one of: a drive power, a total output of the engine, the first rotary machine, and the second rotary machine; a required drive force; a state of charge level of a battery; and a voltage of the battery.

3. The drive force control system for a hybrid vehicle as claimed in claim 1, further comprising:
   a purification device that purifies an exhaust of the engine,
   wherein the controller is further configured to determine that the engine is in load operation where the engine is driven at a speed higher than the idling speed based on a fact that a temperature of the purification device is lower than a predetermined temperature.

4. The drive force control system for a hybrid vehicle as claimed in claim 1, wherein the controller is further configured to determine that the engine is in load operation where the engine is driven at a speed higher than the idling speed based on a fact that the vehicle is stopped by operating an accelerator to generate a drive force and a brake to establish a brake force simultaneously.

5. The drive force control system for a hybrid vehicle as claimed in claim 1, further comprising:
   a defroster that blows an exhaust heat from the engine, and
   wherein the controller is further configured to determine that the engine is in load operation where the engine is driven at a speed higher than the idling speed based on a fact that the defroster is in operation.

6. The drive force control system for a hybrid vehicle as claimed in claim 1, wherein the controller is further configured to prevent selection of the first mode when the hybrid vehicle is expected to be propelled in the reverse direction, or the engine is expected to be in load operation where the engine is driven at a speed higher than an idling speed.

7. The drive force control system for a hybrid vehicle as claimed in claim 6, wherein the controller is further configured to switch the operating mode from the first mode to the second mode before propelling the hybrid vehicle in the reverse direction, when the hybrid vehicle propelled in the first mode is expected to be propelled in the reverse direction.

8. The drive force control system for a hybrid vehicle as claimed in claim 1, wherein the first rotary machine establishes a reaction torque when the engine is in load operation where the engine is driven at a speed higher than the idling speed, and the first rotary machine does not establish a reaction torque when the engine is driven at a speed lower than the idling speed or the engine stops.

9. The drive force control system for a hybrid vehicle as claimed in claim 8, wherein a torque delivered from the engine to the output member through the transmission mechanism when the engine is in load operation where the engine is driven at a speed higher than the idling speed and the first motor establishes a reaction torque in a direction opposing the reverse torque.

10. The drive force control system for a hybrid vehicle as claimed in claim 1,
- wherein the first rotary machine includes a first motor having a generating function,
- the second rotary machine includes a second motor that generates a drive torque when an electric power is supplied thereto, and
- the first motor is adapted to translate a power applied thereto from the engine through the transmission mechanism into an electric power, and to supply the translated electric power to the second motor to generate the reverse torque by the second motor.

* * * * *